Nov. 2, 1943. W. H. BAGLEY, JR 2,333,227
METHOD OF MAKING BEARINGS
Filed Sept. 25, 1940
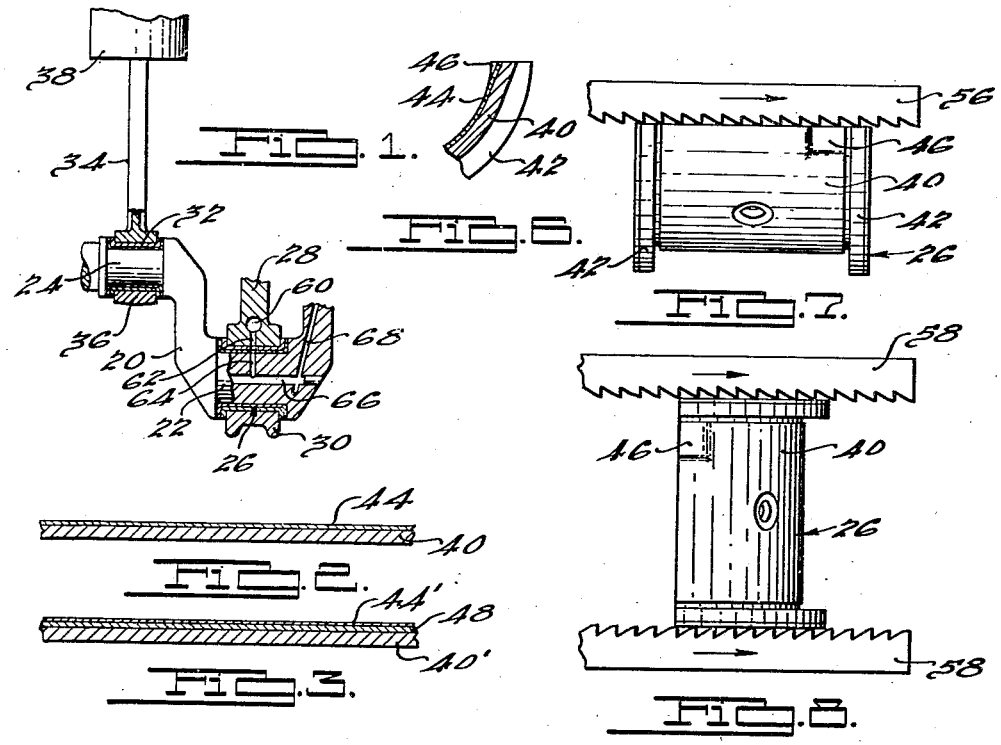
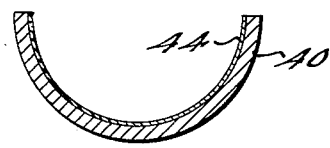
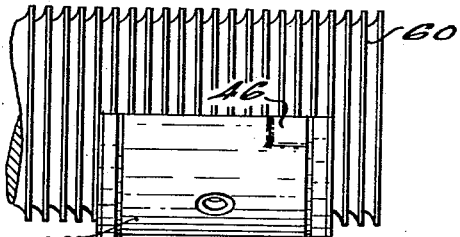
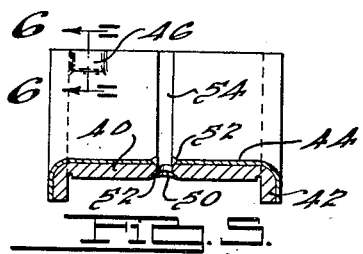
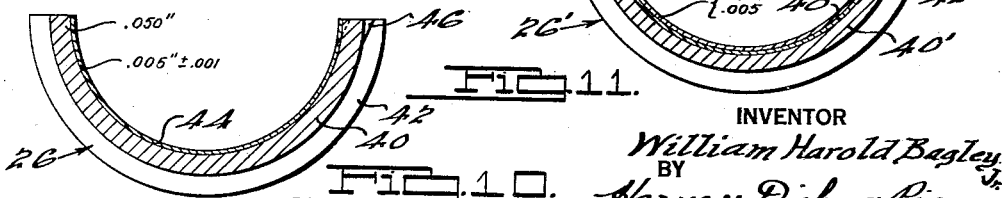
INVENTOR
William Harold Bagley Jr.
BY
Harness, Dickey & Pierce
ATTORNEYS.

Patented Nov. 2, 1943

2,333,227

UNITED STATES PATENT OFFICE 2,333,227

METHOD OF MAKING BEARINGS

William Harold Bagley, Jr., Detroit, Mich., assignor to Electro Bearing Company, Detroit, Mich., a corporation of Michigan Application September 25, 1940, Serial No. 358,248

3 Claims. (Cl. 29—149.5)

This invention relates to bearings and particularly to the so-called shell type of bearing of the type commonly employed in connection with internal combustion engines in accordance with present day practices, the principal object being the provision of an improved bearing of the type described as well as a method of manufacturing the same. It includes some of the subject-matter of my abandoned application for Letters Patent of the United States for Bearings, filed December 12, 1936, and serially numbered 115,560, and is also a continuation in part of my co-pending application for Letters Patent of the United States for improvements in Bearings, filed August 14, 1939, now Patent No. 2,316,119, issued April 6, 1943.

Objects of the invention include the provision of a method of manufacturing bearings of the type described including certain consecutive steps of operation; the provision of a method of making a bearing of the type described including a steel backing member and a thin coating of bearing material secured thereto including the steps of initially providing a flat steel blank, applying bearing metal to one face thereof, machining the bearing material to bring the assembly to a desired initial thickness, thereafter subjecting the flat blank to suitable forming operations to bring it to semi-cylindrical conformation, and finally machining away a portion of the bearing material thereof to bring the thickness thereof left on the finished bearing to the desired final state; the provision of a method of forming a bearing of the type described comprising employing flat steel stock the thickness of which is held to unusually close limits and applying a coating of bearing material thereto either directly or with the interposition of a coating of copper or copper composition, aluminum, silver composition or equivalent coating interposed between it and the steel strip, then initially machining the bearing material while on strip to bring the thickness of the assembly to a desired initial value, then blanking out suitable areas of the strip, acting upon the blanks to bring them to semi-cylindrical conformation with that surface thereof provided with the bearing material on the radially inner face thereof, simultaneously forming end flanges on the blank where desired, finally subjecting the blank to a coining operation to accurately determine the exterior conformation of the bearing, and then subjecting the bearing to final machining operations to bring it to the desired finished size including a further machining of the bearing material to reduce its thickness to a value not materially exceeding and even less than five thousandths of an inch but of sufficiently great thickness to insure its covering the pores of the steel backing member.

Further objects of the invention include the provision of an article of manufacture constructed according to the above method.

The above being among the objects of the present invention the same consists in certain novel features of construction, a shell bearing of novel construction, and the step or steps of operation in the manufacture of a shell bearing to be hereafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a fragmentary, partially broken, partially sectioned view illustrating a portion of the crank shaft of an internal combustion engine including one main journal and the support therefor and one connecting rod journal and a connecting rod connected thereto, bearings constructed in accordance with the present invention receiving the journals;

Fig. 2 is a fragmentary sectional view taken longitudinally through a strip of steel to which a layer of bearing material has been directly applied and which will later be cut up into blanks of suitable length for the purpose of producing bearings therefrom;

Fig. 3 is a view similar to Fig. 2 but illustrating a construction in which a layer of copper or equivalent composition is interposed between the face of the steel strip and the layer of the bearing material;

Fig. 4 is a sectional view taken through a blank after it has been bent to semi-spherical conformation, such section being taken in a plane perpendicular to the axis of the blank;

Fig. 5 is a vertical sectional view taken axially through a blank after it has reached a more nearly completed stage in the manufacture of the same including the provision of flanges at opposite ends thereof;

Fig. 6 is an enlarged transverse sectional view taken on the line 6—6 of Fig. 5 and illustrating the construction of the bearing lock;

Fig. 7 is a more or less diagrammatic view illustrating the operation of broaching the edges of the bearing in order to bring them into final conformation with that desired in the completed bearing;

Fig. 8 is a more or less diagrammatic view illustrating the operation of broaching the opposite ends of the bearing to bring the length of the same to its final dimensions;

Fig. 9 is a more or less diagrammatic view illustrating the step of broaching the internal surfaces of the bearing in order to reduce the layer of bearing material to the desired thickness and to bring the bore of the bearing to the desired diameter;

Fig. 10 is a transverse sectional view taken through a completed bearing when formed from the type of strip illustrated in Fig. 2; and, Fig. 11 is a transverse sectional view taken through a completed bearing when formed from a strip such as illustrated in Fig. 3.

In modern high speed types of internal combustion engines, the main bearings for the engine, and particularly those for the crank shaft and the big ends of the connecting rods, are of the so-called "shell" type. In other words the bearings are made in the form of a split cylindrical shell, each half of which is substantially semi-cylindrical in conformation. The engine crankcase is provided with suitable bearing supports, each provided with a removable cap, providing a cylindrical bore for the reception of the bearing shells for the main journals of the crank shaft, and the big end of each connecting rod is provided with a removable cap and provides a similar cylindrical opening for reception of the bearing shells for the crank pins. The bearing shells, or as more conventionally known, the bearings, are formed entirely independently of the parts adapted to support them in service and are simply assembled thereto during manufacture and/or repair of the engine.

Modern day practice demands, particularly for automotive vehicles of the pleasure type and for airplanes, internal combustion engines of minimum weight and vibration and, accordingly, particularly the rotating and/or the reciprocating parts of the engine are constructed as lightly as is feasible according to good engineering practices. In the present high speed engines considerable difficulty has heretofore been encountered in bearing failures.

Many factors enter into these failures, but among the chief reasons are excessive pressures, high temperatures, and flexing of the bearings. Connecting rods of internal combustion engines in particular and particularly the lower or big ends thereof are subjected to relatively enormous stresses at high engine speeds and particularly at the moments at which the corresponding pistons are at approximately top and bottom dead center positions, due particularly to the tremendous forces necessary to reverse the direction of reciprocation of the corresponding pistons, piston pin, and the remaining portions of the connecting rods. These forces are of such great magnitude, particularly at high engine speeds, as to tend to and actually cause distortion of the lower end of the connecting rod and the bearing carried thereby to force it to conform to the shape and contour of the cooperating journals. While the distortion of the bearing under such circumstances may be relatively small, as for instance the distortion of the bearing a thousandths of an inch or less out of its true cylindrical conformation, nevertheless it has been shown that repeated flexing of the bearings in the direction of the maximum forces acting upon the corresponding rod because of this effect, causes the bearings to first fail over those areas thereof immediately adjacent the longitudinal center line of the connecting rod.

Experience has taught the necessity of using a relatively soft bearing material of the babbitt type to accommodate the requirements of modern high speed engine practice and, accordingly, it will be understood that in the following specification and claims that the term babbitt as employed herein refers to tin, lead, silver, cadmium, or other equivalent base bearing alloys. Such alloys have the advantage of being relatively soft and of not injuring the shaft in case of failure of the oil supply or in case dirt or grit be carried with the oil finds its way into the space between the journal and the bearing. In the latter case this soft type of babbitt permits such dirt or grit to become imbedded therein without exerting an abrasive effect upon the journal which would occur in the use of bearing materials of harder characteristics.

In order to obtain the desired flexibility of the bearing, in accordance with the present invention the steel backing member is made as relatively thin as practical, preferably not over $\frac{1}{16}$ of an inch in a two inch bearing and preferably less, although a slightly thicker backing member may be employed without material disadvantages from the standpoint of effecting the life of the bearing in service. However, the use of the thinner backing members not only increases the flexibility of the bearing and the attendant advantages are thereby increased, but the cost of manufacture is reduced and the ease of manufacture is enhanced by the use of the thinner material. Furthermore, it has been found that thin layers of babbitt do not fatigue as quickly as thicker layers, and this particularly where the babbitt layer is not materially thicker than .005".

It has heretofore been proposed to manufacture steel backing bearings of the type described in which the thickness of the babbitt coating was as low as fifteen thousandths of an inch, but bearings of this type have not shown any marked improvements over bearings having a babbitt coating or layer of materially greater thickness. My experiments show that there is a critical point in the thickness of the babbitt coatings or layers at which the marked increase in the life of the bearing takes place. This critical value is slightly in excess of five thousandths of an inch and where the thickness of the babbitt coating is reduced to such thickness or to a lesser thickness, bearings otherwise identical are found to have a length of life many times greater than bearings having a materially thicker coating.

It has also been proposed to provide bearings of the type under discussion with a babbitt coating or layer of no greater thickness than one-half of one thousandth of an inch or less. However, when it is attempted to provide such film-like coatings of babbitt directly upon a steel backing member it is impossible for the babbitt to close all of the pores in the steel, thus exposing portions of the raw steel of the backing member directly to the journal of the rotating parts formed thereby, and in any event the coating is so thin as to render it commercially impossible to machine such coatings to bring them into a desired state of final size, shape and contour required in present day engine construction. Moreover, because of the inevitable inaccuracies in the surface of the associated steel backing member any attempt to machine such thin coatings is almost certain to expose the steel backing member through the lining for direct contact with the associated journal. Additionally, it will be appreciated that a certain amount of clearance must necessarily be initially provided between any bearing and its associated journal so as to permit lubricant to be introduced between them to form an anti-friction film, and this is particularly so if the bearing is to be used in internal combustion engines. Moreover, this film should be of a thin and of uniform thickness otherwise it is susceptible to rupture in operation which would endanger consequent burning out of the bearing. Such clearance in a two inch bearing, that is the clearance between the bearing and its associated journal in modern internal combustion engine practice is usually from .0005" to .0020". It will be appreciated that any hard particles of foreign material which may be carried by the lubricant fed to the bearing may find its way to the space between the bearing and its journal providing its size is not any greater than the clearance between the bearing and the journal. From a practical standpoint it is impossible to filter all of such foreign material from the lubricant. Where the thickness of the babbitt layer is greater than the clearance between the bearing and the shaft and the babbitt of the type herein referred to is employed in the bearing, such hard particles will be imbedded in the soft babbitt before material damage has been caused to the surface of the journal and thereafter will be located out of a position wherein they may cause damage to the surface of the journal. Obviously, if the babbitt coating is of less thickness than the clearance between the shaft and the journal, as in the particular instance last referred to, such particles of foreign material cannot be sufficiently imbedded in the babbitt coating with the result that they are continuously exposed for abrasive action against the journal received by the bearing and early destruction of the journal and bearing will consequently occur.

In the broader aspects of the present invention it makes no difference whether the babbitt is applied directly to the steel backing member or whether a relatively thin intermediate layer of copper, copper alloy, aluminum, silver, or equivalent composition or alloy, hereinafter referred to only as "copper" for the purpose of simplicity of description, is employed, the latter construction being preferred by some engine manufacturers principally for the reason that in event of burning out of the bearing the journal of the crank shaft will not directly contact the steel backing member but instead will contact the copper layer which will thus minimize the damage which might otherwise occur to the surface of the cooperating journal. The layer of the copper in such event is preferably approximately twice the thickness of the babbitt layer. The copper layer has the theoretical advantage of distributing the heat through the rest of the bearing from any localized hot spots that might occur therein, but I have found that where a babbitt layer of substantially no greater thickness than herein specified is employed directly upon a steel backing member, the heat from any localized hot spot in the bearing is transferred to the backing member with sufficient rapidity to eliminate the breaking down or melting of any localized spots of babbitt.

In the manufacture of bearings in accordance with the present invention certain steps of operation are preferably followed and certain precautions taken in the manufacture which forms a further part of the present invention, these steps of operation being generally necessary in order to obtain commercially a satisfactory bearing of the type described. These steps of operation will, therefore, be explained in more or less detail in order to disclose to those skilled in the art the preferred method of manufacturing these bearings.

Referring now to the accompanying drawing and particularly to Fig. 1 the portion of crank shaft for an internal combustion engine is indicated generally at 20 and as having a main journal 22 and a connecting rod journal 24. The main journal 22 is rotatably supported between a pair of cooperating half shell bearings indicated generally at 26 which in turn are supported by a web 28 of a crankcase (not shown) and cooperating bearing cap 30. The crank pin 24 is surrounded by a pair of half shell bearings 32 carried by the big end of a cooperating connecting rod 34 and its cooperating cap 36, it being understood that the connecting rod 34 is suitably connected to a piston 38 in a suitable or conventional manner. It will be understood that it is the bearing shells 26 and 32 to which the present invention relates, and, while in the broader aspects of the invention it makes no difference whether these shell bearings are provided with peripheral flanges or not, the peripheral flange type is shown by way of illustration as there are a greater number of steps required in the manufacture of the same than in the unflanged type, it being understood that in the following description where a method is described for making a flange on this type of bearing, those steps described in connection with the flanging of the bearing shell will, of course, simply be omitted in the manufacture of an unflanged bearing.

For the purpose of illustration it may be assumed that the half bearing illustrated in Fig. 10 is part of the bearing 26 in Fig. 1, and referring to Fig. 10 it will be noted that this bearing comprises a semi-cylindrical steel backing part 40 the opposite ends of which are radially outwardly flanged as at 42, with the inner surface of the part 40 and the axially outer surfaces of the flanges 42 covered with a layer 44 of babbitt of the type described. The thicknesses of the material illustrated in the drawing is exaggerated as an aid to clarity in description, it being understood that the thickness of the steel backing member 40 in actual practice will preferably be in the neighborhood of .050" although it will, of course, be appreciated that this thickness may vary to a greater or lesser extent and, for instance in bearings of the size mentioned, namely a two inch bearing, may vary from $\frac{1}{32}$ of an inch to $\frac{5}{64}$ of an inch in thickness, and will vary correspondingly for bearings of different sizes. The thickness of the babbitt coating 44 will preferably be in the neighborhood of .005" and preferably within a thousandth of an inch above or below this figure, but, on occasion, may be reduced to as little as .0015". As indicated in Fig. 10 a portion of both the backing member 40 and babbitt 44 is outwardly struck as at 46 along one edge of the bearing and preferably adjacent one end thereof to provide a stop surface adapted to be received in a corresponding notch or groove formed in the associated support and adapted to abut against the supporting member on the opposite side of the plane of split of the bearing in order to positively lock the bearing shell against rotation in its support, this offset portion

46 being conventionally provided and known as a bearing lock.

Where it is desired to employ an intermediate layer of copper or other composition as above specified between the backing member and the babbitt coating, then the bearing will be of a construction such as illustrated in Fig. 11 in which 40' illustrates the steel backing member, 42' the flange, 44' the babbitt layer, and the intermediate copper layer at 48. Inasmuch as in such case it will usually be desirable that the total thickness of the bearing shell be substantially the same as that illustrated in Fig. 10 where only the steel backing member and babbitt liner are employed, the steel backing member 40' in this case will preferably be in the neighborhood of .040" in thickness for a two inch diameter bearing but this thickness may vary substantially within the limits of the steel backing member 40 previously described. The layer 48 of copper in this case will preferably be in the neighborhood of .010" in thickness and the layer of babbitt between .0015" and .005" in thickness, it being possible to use a thinner layer of babbitt in this case than in the former case for the reason that the copper layer provides protection against direct contact of the journal with the steel backing member in event of failure of the babbitt, and also eliminates to a great extent the possibility of the cutting tool employed in the final sizing operation of the bore of the bearing from coming into direct contact with the steel backing member in event it should inadvertently cut through the babbitt layer due to one reason or another.

Except for the initial operations in preparing the steel strip from which the bearings are to be made the general steps of operation follow in the manufacture of these two types of bearings are substantially identical. In the manufacture of the bearing illustrated in Fig. 10 a strip of steel slightly in excess of a width suitable for the exact length of the bearing to be formed, including the flanges 42 when provided, comprises a starting point in the operation. Usually such strips of steel will be provided in coil form and for the purposes of manufacturing bearings in accordance with the present invention such strips of steel are preferably rolled out with super-finished rolls as to impart a high degree of finish to the strips, and the strips are rolled to an unusually small tolerance, preferably within .0005" of a determined thickness, this being necessary because of the relatively thin layer of babbitt required in the final product and the method of producing it. The initial operation on this strip is to tin the surface thereof, either before or after a straightening operation, but not more than .00001" of tin is permitted to remain upon the surface of the same. The purpose of this tinning is, of course, to facilitate the bonding of the babbitt layer thereto and except for its bonding effect it may be, and is hereinafter considered as not present except where specifically referred to. For the purpose of clarity in description this steel strip is illustrated in Fig. 2 at 40. After the strip 40 has been tinned then a coating 44 of babbitt is applied thereto by any suitable method such for instance as applying the babbitt in molten form to the strip 40 as it passes below a suitable spout, the strip 40 being brought to a suitable high temperature for reception of the babbitt and a suitable gate or scraper preferably being employed for limiting the thickness of the coating of babbitt as it is applied to the strip. As much as 1/16 of an inch of babbitt may thus be applied to the strip 40. Where the intermediate layer 48 of copper is to be employed, this coating may be applied in any suitable manner to the strip 40', which, of course, is of identical character to the strip 40 explained in connection with Fig. 2, without the necessity of providing the tinning step and may be applied in any suitable manner. For instance, it may be applied by an electrolytic plating process, or it may be applied in solid strip form to the face of the steel strip and with the interposition of a suitable flux and passed through a suitable furnace so as to cause it to be bonded to the steel strip. Thereafter the surface of the copper layer itself, or the entire strip, may be provided with a thin coating of the same general character and thickness as the tin coating first described followed by the application of the babbitt layer 44' thereto in substantially the same thickness as the coating 44 described in connection with Fig. 2. Regardless of whether the babbitt coating is applied directly to the steel as in Fig. 2 or to a copper layer first applied to the surface of the steel strip as in Fig. 3, the resulting assembly is then straightened out if not already straightened or levelled and is subjected to a suitable machining operation, as for instance a milling operation, in which the thickness of the babbitt layer is reduced to preferably approximately ten to twenty thousandths of an inch and preferably about fifteen thousandths of an inch.

After the steel strip has been prepared as described in connection with Figs. 2 and 3, then the following described operations required to bring the strip to a condition of final form as a completed bearing are identical in either case and in either case the strip is then acted upon to form it into blanks of the desired length and, where necessary, width. The following operations will be described in connection with the strip 40 and babbitt layer 44 illustrated in Fig. 2, it being understood that the same operations will be required where the strip illustrated in Fig. 3 is employed instead thereof.

After the blanks are thus formed from the strip each blank is then acted upon to form it into generally semi-cylindrical conformation as illustrated in Fig. 4 with the babbitt layer 44 on the radially inner side thereof. Where the bearing is to be provided with flanges such as the flanges 42 such flanges may be partially formed in the initial forming operation illustrated in Fig. 4, but in any event, where the flanges are to be provided, a series of successive flange forming operations are necessary to bring the flanges into their final state, particular care being required, however, in the formation of these flanges due to the differences in ductility and elongation of the steel and the babbitt. The steel that must be used in this particular case should be of a deep drawing material, so as to insure uniformity in dimensions and trueness of the back of the bearing when completed. In order to form the flange without cracking or breaking the babbitt at the corners it is necessary to employ several operations here outlined. The metal for the flange is moved by steps, and in each flange operation excessive pressure is applied directly on the babbitt at the outside corners of the flange, to elongate and thin the babbitt slightly, just enough to prevent it from cracking until the final forming is completed. During these forming operations the bi-metal strip is preferably heated to a temperature of approximately 200° F. This makes the babbitt somewhat more ductile.

The size and shape of the blank initially employed in forming a bearing as thus defined is originally determined by trial and error until the best possible shape is obtained to carry out the following forming operations. A surplus of stock of preferably about ⅛ to ¼ of an inch is generally allowed to trim off the joint line of the bearing after final forming, and about ⅛ of an inch to trim off of the outside diameter of the flanges. These trimming operations which are performed after the blank has been formed as above described are to remove the slightly cracked edges of the metal and also to correct the joint line of flange and diameter dimension.

After the trimming operations are completed, the bearing as thus far formed is then subjected to a coining operation in an embossing press. This operation is to bring the outer dimensions of the bearing to final size and to correct any inaccuracies in dimensions and trueness of the bearing surface thus far formed and brings the exterior size, shape and contour of the steel backing member into exact accordance with that desired in the final product. It will also be appreciated that in all of the above described operations, no babbitt whatsoever may be on the back face of the shell, and not more than .00001" of tin.

The bearing shell, made as accurately as possible by press operations and initial machining operations as above described, is then subjected to the final machining operations. These are necessary to provide the bearing lock, the oil grooves and oil holes, and to bring the bearings within the limits allowed. In accordance with present day practices all of the bearing dimensions must be held within very close limits as, for instance, within .00025".

The first of these operations may consist of forming the bearing lock 46 which may be readily accomplished by a suitable press operation as will be readily understood by those skilled in the art. One or more oil holes such as 50, as may be required, are then drilled in each bearing and such hole is countersunk on the opposite sides thereof as at 52. The next operation consists in machining the oil grooves 54, such operation being commercially impractical to attempt by a stamping or embossing operation and consequently must be left for a machining operation subsequent thereto. The bearing then reaches a state of completion illustrated in Fig. 5. The next operation is illustrated in Fig. 7 and comprises final machining of the joint line of the bearing and this is preferably accomplished by means of a broach such as 56 for the reason that by employing a broach the best possible finish to the steel and babbitt along the joint line is obtained. The next operation consists in chamfering the flange 42 and machining the radius of the babbitt at each end of the bearing. Following the chamfering of the flange and the machining of the radius the shell is then subjected to a tinning operation which provides it with an extremely thin coating of tin or cadmium, preferably not exceeding .000075" in thickness so as to provide a coating for the exposed surfaces of the steel backing member 40 to prevent rusting thereof, and then the bearing is subjected to the operation illustrated in Fig. 8 in which the end faces of the flanges 42 are machined to bring the bearing to proper length. This operation is preferably performed between a pair of broaches such as 58 by means of which the length is accurately determined and the machined faces of the flanges are provided with a high degree of finish.

The next operation is the final operation which is illustrated in Fig. 9 and in which a half bearing shell brought to the state of completion thus far described is machined to the required diameter preferably by means of a broach such as 60, this operation preferably removing approximately two-thirds of the thickness of the babbitt provided in the bore and resulting in a final bearing having the babbitt thicknesses illustrated in and explained in connection with Figs. 10 and 11. It will be appreciated that by employing a broach such as 60 for this final operation a high degree of finish may be imparted to the bore and its diameter may be brought into substantially exact conformance with the desired diameter and wall thickness thereof.

It will be understood that when two half bearings such as those described are employed as the bearing 26 for the crankshaft journal 22 as illustrated in Fig. 1, the cap 30 is removed, one-half bearing shell is inserted in the seat provided therefor in the web 28 with the lock 46 received in the corresponding recess formed in such seat. The crankshaft 20 is then positioned in place in the bearing, the remaining half shell is applied to the exposed half of the journal 22, the cap 30 is applied with the corresponding lock 36 received in the corresponding recess provided for therein, and the cap 30 is securely bolted into place on the web 28. It will be appreciated that the diameter of the bore in the bearing thus provided is so proportioned to the diameter of the journal 22 that a clearance of between .0005" and .0020" usually and preferably results between the bearing and the journal. Lubricating oil under pressure is fed through a suitable opening such as 60 in the web 28 and then through a passage such as 62 to the oil hole 50 in the associated half bearing 26, the oil flowing through such opening and into the groove 54 from which a portion of the lubricant may flow axially of the journal 22 to provide the necessary lubrication for the same. A portion of the lubricant flows through a radial passage such as 64 in the journal 22 and into an axial passage 56 provided therein from which it may flow as through a passage such as 68 in the associated crank arm to the next adjacent crank pin or pins 24 where it is led to the surface of the crank pin or pins in order to provide lubrication for the cooperating bearing or bearings 32.

It will be understood that bearings such as those described and formed in the manner explained embody characteristics materially superior to those of bearings of a similar nature employed before my invention.

Formal changes may be made in the specific embodiment of the invention described without departing from the spirit or substance of the broad invention, the scope of which is commensurate with the appended claims.

What I claim is:

1. In the manufacture of a shell type bearing, the steps of operation comprising operating upon a strip of steel to bring its thickness to substantially within .0005" of a desired thickness, operating upon said strip of steel to provide at least one face thereof with a coating of tin of substantially no greater thickness than .00001", applying a coating of Babbitt metal to said tinned surface in bonded relation with respect thereto and to a thickness in excess of .015", subjecting said strip to a machining operation whereby to reduce the thickness of said babbitt coating to from .010" to .035", operating upon said strip to form blanks of predetermined size and shape therefrom, operating upon each of said blanks to form it into substantially semi-cylindrical conformation with said babbitt coating on the radially inner side thereof, subjecting said formed blanks to a coining operation whereby to closely predetermine the exterior size, shape and contour thereof, subjecting said blanks to a machining operation whereby to form at least one oil hole extending therethrough and at least one oil groove on the radially inner side thereof, subjecting the circumferential edges of said blank to a machining operation whereby to remove sufficient metal therefrom to render said blanks substantially exactly semi-cylindrical, subjecting said blanks to a machining operation by removing metal from the axial ends thereof whereby to bring the length of said machined blank into substantially exact conformance with predetermined dimensions, and then machining away sufficient of the interior babbitt coating of said blank to reduce the thickness thereof to approximately .005" thereby to finally convert said blank into a completed bearing.

2. In the manufacture of a shell type bearing, the steps of operation comprising operating upon a strip of steel to bring its thickness to substantially within .0005" of a desired thickness, operating upon said strip of steel to provide at least one face thereof with a coating of tin of substantially no greater thickness than .00001" applying a coating of Babbitt metal to said tinned surface in bonded relation with respect thereto and to a thickness in excess of .015", subjecting said strip to a machining operation whereby to reduce the thickness of said babbitt coating to from .010" to .035", operating upon said strip to form blanks of predetermined size and shape therefrom, acting upon said blank to bring it into approximately semi-cylindrical conformation with the babbitt coating thereof on the radially inner sides thereof and to provide radially outwardly directed flanges at opposite ends thereof, subjecting said formed blanks to a coining operation whereby to closely predetermine the exterior size, shape and contour thereof, subjecting said blanks to a machining operation whereby to form at least one oil hole extending therethrough and at least one oil groove on the radially inner side thereof, subjecting the circumferential edges of said blank to a machining operation whereby to remove sufficient metal therefrom to render said blanks substantially exactly semi-cylindrical, subjecting said blanks to a machining operation by removing metal from the axial ends thereof whereby to bring the length of said machined blank into substantially exact conformance with predetermined dimensions, and then machining away sufficient of the interior babbitt coating of said blank to reduce the thickness thereof to approximately .005" thereby to finally convert said blank into a completed bearing.

3. In the manufacture of a shell type bearing, the steps of operation comprising operating upon a strip of steel to bring its thickness to substantially within .0005" of a desired thickness, operating upon said strip of steel to provide at least one face thereof with a coating of tin of substantially no greater thickness than .00001", applying a layer of copper of approximately .010" in thickness to one face of said strip, then applying a coating of Babbitt metal to said copper coating and to a thickness in excess of .015", subjecting said strip to a machining operation whereby to reduce the thickness of said babbitt coating to from .010" to .035", operating upon said strip to form blanks of predetermined size and shape therefrom, operating upon each of said blanks to form it into substantially semi-cylindrical conformation with said babbitt coating on the radially inner side thereof, subjecting said formed blanks to a coining operation whereby to closely predetermine the exterior size, shape and contour thereof, subjecting said blanks to a machining operation whereby to form at least one oil hole extending therethrough and at least one oil groove on the radially inner side thereof, subjecting the circumferential edges of said blank to a machining operation whereby to remove sufficient metal therefrom to render said blanks substantially exactly semi-cylindrical, subjecting said blanks to a machining operation by removing metal from the axial ends thereof whereby to bring the length of said machined blank into substantially exact conformance with predetermined dimensions, and then machining away sufficient of the interior babbitt coating of said blank to reduce the thickness thereof to approximately .005" thereby to finally convert said blank into a completed bearing.

WILLIAM HAROLD BAGLEY, Jr.